(12) United States Patent
Yamauchi

(10) Patent No.: US 9,593,174 B2
(45) Date of Patent: Mar. 14, 2017

(54) ACETOACETYL GROUP-CONTAINING POLYVINYL ALCOHOL RESIN POWDER COMPOSITION, AND PRODUCTION METHOD THEREFOR

(71) Applicant: THE NIPPON SYNTHETIC CHEMICAL INDUSTRY CO., LTD., Osaka (JP)

(72) Inventor: Yoshihito Yamauchi, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 15/024,118

(22) PCT Filed: Oct. 10, 2014

(86) PCT No.: PCT/JP2014/077131
§ 371 (c)(1),
(2) Date: Mar. 23, 2016

(87) PCT Pub. No.: WO2015/064337
PCT Pub. Date: May 7, 2015

(65) Prior Publication Data
US 2016/0237183 A1    Aug. 18, 2016

(30) Foreign Application Priority Data
Oct. 30, 2013  (JP) ................................. 2013-225543

(51) Int. Cl.
*C08F 8/14* (2006.01)

(52) U.S. Cl.
CPC ...................................... *C08F 8/14* (2013.01)

(58) Field of Classification Search
CPC ............. C08F 8/00; C08F 8/14; C08F 216/06
See application file for complete search history.

(56) References Cited

U.S. PATENT DOCUMENTS

2009/0253865 A1*  10/2009  Shibutani ................. B41M 5/44
525/59

FOREIGN PATENT DOCUMENTS

| JP | H09-25379 A | 1/1997 |
| JP | 2000-63427 A | 2/2000 |
| JP | 2002-308928 A | 10/2002 |
| JP | 2007-277492 A | 10/2007 |
| JP | 2010-168500 A | 8/2010 |

OTHER PUBLICATIONS

International Search Report issued with respect to application No. PCT/JP2014/077131, mail date is Jan. 6, 2015.
International Preliminary Report on Patentability issued with respect to application No. PCT/JP2014/077131, mail dates May 12, 2016.

* cited by examiner

*Primary Examiner* — Jeffrey Mullis
(74) *Attorney, Agent, or Firm* — Greenblum & Bernstein, P.L.C.

(57) ABSTRACT

Acetoacetyl group-containing polyvinyl alcohol resin powder composition containing a C1 to C3 alcohol in an amount of 0.5 to 4 wt % is produced by allowing a powdery polyvinyl alcohol resin to react with diketene, washing the resulting acetoacetyl group-containing polyvinyl alcohol resin particles with the C1 to C3 alcohol to remove an unreacted portion of the diketene, and drying the intermediate acetoacetyl group-containing polyvinyl alcohol resin particles composition at a temperature of 40° C. to 120° C. at a pressure of not higher than 20 kPa after the washing. The acetoacetyl group-containing polyvinyl alcohol resin powder composition thus produced is highly soluble in water.

6 Claims, No Drawings

ACETOACETYL GROUP-CONTAINING POLYVINYL ALCOHOL RESIN POWDER COMPOSITION, AND PRODUCTION METHOD THEREFOR

TECHNICAL FIELD

The present invention relates to acetoacetyl group-containing polyvinyl alcohol resin powder composition which forms an aqueous solution having a very low insoluble content, and a production method therefor.

BACKGROUND ART

Conventionally, an acetoacetyl group-containing polyvinyl alcohol resin (hereinafter sometimes abbreviated as "AA-PVA") obtained by acetoacetylating a polyvinyl alcohol resin (hereinafter sometimes abbreviated as "PVA") is proposed. It is known that the AA-PVA is excellent in water resistance due to high reactivity with various crosslinking agents. Exemplary AA-PVA production methods hitherto proposed are as follows:
(1) An AA-PVA production method which involves a reaction between a PVA and diketene in the presence of a fatty acid ester (methyl acetate) and an acid anhydride (acetic anhydride) (PTL 1);
(2) An AA-PVA production method which involves a reaction between a PVA and diketene in the presence of an organic acid (acetic acid) and an acid anhydride (acetic anhydride) (PTL 2);
(3) An AA-PVA production method which involves a reaction between a PVA and diketene in the presence of an organic acid (acetic acid) and water (PTL 3);
(4) An AA-PVA production method which uses a powdery PVA having an average particle diameter of 250 to 1000 μm and including particles each having a particle size of not greater than 150 μm in a proportion of not greater than 20 wt % (PTL 4); and
(5) An AA-PVA production method which includes the step of drying any of the AA-PVAs produced by the aforementioned methods in a reduced pressure atmosphere at 100 mmHg (PTL 5).

RELATED ART DOCUMENTS

Patent Documents

PTL 1: JP-A-2000-063427
PTL 2: JP-A-2002-308928
PTL 3: JP-A-2007-277492
PTL 4: JP-A-2010-168500
PTL 5: JP-A-HEI9(1997)-25379

SUMMARY OF INVENTION

The AA-PVAs produced in the aforementioned manner are each required, for example, to be capable of forming an excellent aqueous solution having a lower insoluble content, and particularly required to be highly soluble in water. However, an AA-PVA having satisfactory characteristic properties has not been provided yet, and development of such an AA-PVA is desired.

In view of the foregoing, it is an object of the present invention to provide AA-PVA powder composition highly soluble in water, and a production method therefor.

The inventor of the present invention conducted intensive studies to provide AA-PVA powder highly soluble in water.

It is a conventional practice to prepare AA-PVA particles, wash the AA-PVA particles with a lower alcohol, and dry the AA-PVA particles for production of the AA-PVA powder. The alcohol used for the washing exerts no influence on the physical properties of the AA-PVA, but may damage the health of operators and emanate odor when the AA-PVA is used. Therefore, it is conventionally considered that the AA-PVA powder finally obtained preferably has a remaining alcohol content close to 0. Where the AA-PVA powder is used in an application field irrelevant to the possibility of the odor and the health damage, AA-PVA powder having a remaining alcohol content of about 5 wt % is generally used in consideration of energy and costs required for the drying. However, the inventor found that, contrary to the common technical knowledge, AA-PVA powder containing the lower alcohol in a predetermined small amount is advantageous for the aforementioned characteristic properties. That is, the inventor found that, where the amount of the lower alcohol falls within the predetermined range, the AA-PVA powder highly soluble in water and having a lower insoluble content can be provided, and attained the present invention. The AA-PVA powder, which contains a small amount of the lower alcohol, is highly soluble in water and has a lower insoluble content. This is supposedly because water can easily enter voids defined between particles of the AA-PVA powder in the presence of a small amount of the lower alcohol in the AA-PVA powder to thereby improve the water solubility.

Features of Present Invention

According to a first inventive aspect, there is provided AA-PVA powder composition including AA-PVA particles and 0.5 to 4 wt % of a C1 to C3 alcohol.

According to a second inventive aspect, there is provided a method of producing the AA-PVA powder composition according to the first inventive aspect, the method including the steps of: preparing AA-PVA particles through a reaction of powdery PVA with diketene; washing the AA-PVA particles with a C1 to C3 alcohol to remove an unreacted portion of the diketene; and drying the intermediate AA-PVA particles composition at a temperature of 40° C. to 120° C. at a pressure of not higher than 20 kPa so as to control the alcohol content of the intermediate AA-PVA particles composition, which is obtained by washing the AA-PVA particles, at 0.5 to 4 wt % after the washing.

The inventive AA-PVA powder composition contains 0.5 to 4 wt % of the C1 to C3 alcohol. Therefore, the AA-PVA powder composition is highly soluble in water. The specific AA-PVA powder composition is produced by preparing the AA-PVA particles through the reaction of the powdery PVA with the diketene, washing the AA-PVA particles with the C1 to C3 alcohol to remove the unreacted portion of the diketene, and drying the intermediate AA-PVA particles composition at a temperature of 40° C. to 120° C. at a pressure of not higher than 20 kPa. The specific AA-PVA powder composition described above can be produced by this production method.

DESCRIPTION OF EMBODIMENTS

An exemplary embodiment (typical embodiment) of the present invention will hereinafter be described, but the present invention is not limited to this embodiment.

The present invention will be described in detail.

The specific AA-PVA powder composition according to the present invention contains a C1 to C3 alcohol in a predetermined amount.

[AA-PVA Particles]

AA-PVA particles as a material for the inventive specific AA-PVA powder composition are particles of a PVA each having acetoacetyl groups in its side chains and prepared by introducing acetoacetyl groups into a powdery PVA obtained by saponification of a polyvinyl ester resin (a polymer of a vinyl ester monomer). More specifically, the AA-PVA has a structural unit represented by the following formula (1). The AA-PVA further has a vinyl alcohol structural unit and an unsaponified vinyl acetate structural unit in addition to the structural unit having the acetoacetyl group as represented by the formula (1).

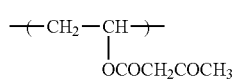  (1)

Examples of the vinyl ester monomer as a material for the polyvinyl ester resin include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate, among which vinyl acetate is preferably used for economy.

A saponification product of a copolymer of the vinyl ester monomer and a monomer copolymerizable with the vinyl ester monomer may also be used. Examples of the copolymerizable monomer include: olefins such as ethylene, propylene, isobutylene, α-octene, α-dodecene and α-octadecene; hydroxy group-containing α-olefins such as 3-butene-1-ol, 4-pentene-1-ol, 5-hexene-1-ol and 3,4-dihydroxy-1-butene, and acylation products and other derivatives of these hydroxy group-containing α-olefins; unsaturated acids such as acrylic acid, methacrylic acid, crotonic acid, maleic acid, maleic anhydride, itaconic acid and undecylenic acid, and salts, mono and dialkyl esters of these unsaturated acids; nitriles such as acrylonitrile and methacrylonitrile; amides such as diacetone acrylamide, acrylamide and methacrylamide; olefin sulfonic acids such as ethylene sulfonic acid, allyl sulfonic acid and methallyl sulfonic acid, and salts of these olefin sulfonic acids; vinyl compounds such as alkyl vinyl ethers, dimethylallyl vinyl ketone, N-vinylpyrrolidone, vinyl chloride, vinyl ethylene carbonate, 2,2-dialkyl-4-vinyl-1,3-dioxolane and glycerol monoallyl ether; substituted vinyl acetates such as isopropenyl acetate and 1-methoxyvinyl acetate; vinylidene chloride, 1,4-diacetoxy-2-butene, 1,4-dihydroxy-2-butene and vinylene carbonate.

Other examples include: polyoxyalkylene group-containing monomers such as polyoxyethylene (meth)acryl ether, polyoxyethylene (meth)acrylamide, polyoxypropylene (meth)acrylamide, polyoxyethylene (meth)acrylate, polyoxypropylene (meth)acrylate, polyoxyethylene [1-(meth)acrylamide-1,1-dimethylpropyl] ester, polyoxyethylene vinyl ether, polyoxypropylene vinyl ether, polyoxyethylene allylamine, polyoxypropylene allylamine, polyoxyethylene vinylamine and polyoxypropylene vinylamine; and cation group-containing monomers such as N-acrylamidemethyltrimethylammonium chloride, N-acrylamideethyltrimethylammonium chloride, N-acrylamidepropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride and diethyldiallylammonium chloride.

In the present invention, the term "(meth)acryl" means acryl and methacryl, and the term "(meth)acrylate" means acrylate and methacrylate.

The amount of the copolymerizable monomer to be introduced may be properly determined depending on the type of the monomer, but typically not greater than 10 mol %, particularly preferably not greater than 5 mol %. If the amount of the monomer to be introduced is excessively great, the water solubility and the chemical resistance will be impaired.

In the case of an ordinary PVA, main chains are mainly bonded to each other by 1,3-diol bonds, and the percentage of the 1,2-diol bonds is about 1.5 to 1.7 mol %. However, the percentage of the 1,2-diol bonds may be increased to 1.7 to 3.5 mol % by employing a higher polymerization temperature for the polymerization of the vinyl ester monomer.

The proportion of the acetoacetyl group-containing structural unit in the AA-PVA particles is typically 0.1 to 20 mol %, more preferably 0.3 to 10 mol %, particularly preferably 1 to 8 mol %. If the proportion of the acetoacetyl group-containing structural unit is excessively small, the water resistance tends to be reduced. If the proportion of the acetoacetyl group-containing structural unit is excessively great, the water solubility tends to be reduced because the acetoacetyl groups react with each other during long-term storage in a higher temperature and higher humidity environment to form a crosslinked structure.

The saponification degree of the AA-PVA particles (the saponification degree of the powdery PVA as the material for the AA-PVA particles) is typically 75 to 99.9 mol %, more preferably 80 to 99.5 mol %, particularly preferably 85 to 99.3 mol %. An excessively low saponification degree of the AA-PVA particles is not preferred, because the water solubility tends to be reduced.

The average polymerization degree of the AA-PVA particles (as measured in conformity with JIS K6726) is typically 300 to 4000, particularly preferably 400 to 2000, more preferably 500 to 1500. If the average polymerization degree is excessively low, the water resistance tends to be reduced. If the average polymerization degree is excessively high, the viscosity tends to be increased, resulting in poorer handlability.

The AA-PVA particles typically have an average particle diameter of 50 to 1000 μm, preferably 100 to 900 μm, particularly preferably 150 to 800 μm. If the average particle diameter is excessively small, the AA-PVA particles are liable to agglomerate during the reaction with the diketene, resulting in reaction unevenness. If the average particle diameter is excessively great, the reaction with the diketene tends to be uneven.

The average particle diameter is herein determined with the use of sieves respectively having mesh sizes of 1700 μm, 1000 μm, 850 μm, 500 μm, 250 μm and 150 μm. The AA-PVA particles are shaken on these sieves by means of a sieve shaking machine to be classified into a particle diameter range of not less than 1700 μm, a particle diameter range of not less than 1000 μm and less than 1700 μm, a particle diameter range of not less than 850 μm and less than 1000 μm, a particle diameter range of not less than 500 μm and less than 850 μm, a particle diameter range of not less than 250 μm and less than 500 μm, and a particle diameter range of not less than 150 μm and less than 250 μm. In a particle size distribution determined based on cumulative weights of particles classified in the respective particle diameter ranges, a particle diameter corresponding to a cumulative value of 50 wt % is defined as the average particle diameter.

[Production of Specific AA-PVA Powder Composition]

The inventive specific AA-PVA powder composition is produced by: preparing AA-PVA particles through a reaction of powdery PVA (material for the AA-PVA particles) with diketene (reaction/preparation step); washing the AA-PVA particles with a C1 to C3 alcohol to remove an unreacted portion of the diketene (washing step); and drying the AA-PVA particles under predetermined conditions (drying step). Exemplary methods for introducing acetoacetyl groups into the powdery PVA through the reaction of the powdery PVA with the diketene include a method such that the powdery PVA is allowed to react directly with gaseous or liquid diketene, a method such that the powdery PVA is preliminarily allowed to absorb and occlude an organic acid such as acetic acid, and then to react with the gaseous or liquid diketene in an inert gas atmosphere, and a method such that a mixture of the organic acid and the diketene is sprayed over the powdery PVA to be allowed to react with the powdery PVA.

A reactor to be used for the reaction is preferably provided with a stirrer, and capable of heating. Examples of the reactor include a kneader, a Henschel mixer, a ribbon blender and other various kinds of blenders.

Specific examples of the C1 to C3 alcohol to be used in the washing step include ethanol, methanol and n-butyl alcohol, among which methanol is preferred because methanol has a lower boiling point and hence requires a smaller amount of energy for the removal thereof.

In the drying step, the drying temperature is typically 40° C. to 120° C., preferably 50° C. to 110° C., particularly preferably 60° C. to 100° C. If the temperature is excessively high, the resin is liable to be degraded. If the temperature is excessively low, an excessively long period of time is required for the drying. The drying pressure is typically not higher than 20 kPa, preferably not higher than 17.3 kPa, particularly preferably not higher than 13.3 kPa. If the pressure is excessively high, a longer period of time is require for the drying. This is disadvantageous for the production process. The lower limit of the pressure is preferably closer to 0 kPa. The drying period is properly selected in consideration of the temperature, the pressure and the weight of the product to be dried, but preferably in a range of 30 to 120 minutes.

The specific AA-PVA powder composition produced in the aforementioned manner typically contains the C1 to C3 alcohol in an amount of 0.5 to 4 wt %, preferably 0.8 to 3.5 wt %, particularly preferably 0.8 to 3.0 wt %. If the amount of the alcohol is excessively great, a problem such as blocking will occur. If the amount of the alcohol is excessively small, the insoluble content will be increased. In the present invention, the expression "the AA-PVA powder contains the C1 to C3 alcohol in the predetermined amount" does not mean that the AA-PVA particles are each impregnated with the C1 to C3 alcohol, but means that the C1 to C3 alcohol is present between the AA-PVA particles and on surfaces of the particles to be generally evenly distributed throughout the AA-PVA particles.

The amount (concentration) of the C1 to C3 alcohol in the AA-PVA powder composition is determined, for example, by measuring the amount of the alcohol remaining in the AA-PVA powder composition by an internal standard method employing gas chromatography. More specifically, where methanol is used as the C1 to C3 alcohol (cleaning liquid), for example, the amount of the alcohol is measured and calculated in the following manner.

(1) A gas chromatography apparatus 7890B (with a detector FID) available from Agilent Corporation and an analysis software ChemStationOpenLAB are used.

(2) A column (made of glass and having a size of 3 mm×3 m) packed with GASCHROPACK 55ID filler is used, and an oven temperature of 150° C., an inlet temperature of 150° C. and a detector temperature of 160° C. are employed. Nitrogen is used as a carrier gas.

(3) A reference solution prepared by measuring out n-propanol (100 µl), methanol (100 µl) and methyl acetate (86 µl) into a 50-ml volumetric flask and filling the flask with pure water up to 50 ml is used.

(4) For preparation of an AA-PVA test solution, 138 ml of pure water and a stirrer are put in a pressure-proof dissolution bottle, and 5.30 g of a measurement sample (AA-PVA powder composition) is dispersed in the water with stirring by the stirrer. After the dispersing, the resulting mixture is heated to 95° C. or higher by means of a hot bath, whereby the AA-PVA powder composition is dissolved in the water. After the complete dissolution is confirmed, the resulting solution is cooled to a room temperature (20° C.±10° C.) After the cooling, n-propanol (100 µl) is added to the solution, and the bottle is tightly capped, followed by stirring. Thus, a homogenous solution is prepared.

(5) The amount of methanol in the AA-PVA powder composition is determined in the following manner.

The peak factor (PF) of methanol is determined from the following expression based on the results for the reference solution, and the concentration (wt %) of methanol is calculated based on the results for the AA-PVA test solution.

<Calculation of Peak Factor (PF) of Methanol>

PF of methanol=(Weight of methanol used/Weight of n-propanol used)/(Area for methanol/Area for n-propanol)=Weight ratio (wt)/Area ratio (AR)

<Calculation of Concentration of Methanol>

Concentration of methanol (wt %)=Weight (g) of n-propanol used×(Area for methanol/Area for n-propanol)×(PF of methanol/5.30)×100

As required, additives such as a defoaming agent, an anti-fungal agent, a preservative and a leveling agent, emulsions and other ingredients may be added to the inventive specific AA-PVA powder composition according to intended use, as long as the features of the invention are not impaired. The amount of these additives to be added is typically, for example, not greater than 10 parts by weight, more preferably not greater than 5 parts by weight, based on 100 parts by weight of the AA-PVA powder composition.

The inventive specific AA-PVA powder composition has the following applications (1) to (10):

(1) Molded/formed products such as fibers, films, sheets, pipes, tubes, leak preventing films, tentative coating films, chemical laces and water soluble fibers;

(2) Adhesive materials such as bonding agents for wood, paper, aluminum foil and plastics, adhesive agents, remoistening agents, nonwoven fabric binders, binders for building materials such as plaster boards and fiberboards, powder granulation binders, additives for cements and mortars, hot-melt adhesive agents, pressure-sensitive adhesive agents and anionic paint fixing agents;

(3) Coating agents such as clear coating agents for paper, pigment coating agents for paper, internal additive sizing agents for paper, sizing agents for fiber products, warp sizing agents, fiber processing agents, leather finishing agents, paints, anti-fogging agents, metal corrosion preventing agents, galvanization lustering agents, anti-static agents, electrically conductive agents and tentative paints;

(4) Hydrophobic resin blending agents such as anti-static agents and hydrophilicity-imparting agents for hydrophobic resins, and additives for composite fibers, films and other formed products;

(5) Suspension/dispersion stabilizing agents such as pigment dispersion stabilizing agents for paints, carbon inks, aqueous color inks and adhesives, and suspension polymerization dispersion stabilizing agents for vinyl compounds such as vinyl chloride, vinylidene chloride, styrene, (meth)acrylates and vinyl acetate;

(6) Emulsion dispersion stabilizing agents such as emulsifying agents for emulsion polymerization of acryl monomers, ethylenically unsaturated compounds and butadiene compounds, and post-emulsifying agents for polyolefins, polyester resins and other hydrophobic resins, epoxy resins, paraffins and bitumens;

(7) Tackifiers such as for aqueous solutions, emulsions and oil-well drilling fluids;

(8) Flocculating agents such as flocculants for aqueous suspensions and dissolved substances, and filtration improving agents for pulps and slurries;

(9) Exchange resins such as ion exchange resins, chelate exchange resins and ion exchange membranes; and

(10) Soil modifying agents, photosensitive agents, photosensitive resist resins, and other agents.

EXAMPLES

The present invention will hereinafter be described more specifically by way of examples. It should be understood that the present invention is not limited to the following inventive examples within the scope of the invention. In the examples, the amounts (parts) are based on weight.

Example 1

Preparation of AA-PVA Powder

In a ribbon blender with a thermostat, 3600 parts of powdery unmodified PVA (having an average polymerization degree of 1200, a saponification degree of 99.2 mol %, and an average particle diameter of 200 μm) was added, and 1000 parts of acetic acid was added to the powdery unmodified PVA to swell the powdery unmodified PVA. The resulting mixture was heated to 60° C. while being stirred at a rotation speed of 20 rpm. Then, 550 parts of diketene was added dropwise to the mixture in 3 hours, and the reaction was allowed to proceed for 1 hour. After the completion of the reaction, the resulting product was washed with methanol. Thus, AA-PVA particles were prepared.

<AA-PVA Particle Drying Step>

Intended AA-PVA powder composition was produced by drying 200 parts of the methanol-containing AA-PVA particles at a pressure of 5.33 kPa at 90° C. for 60 minutes.

<Measurement of Methanol Content>

The methanol content of the resulting AA-PVA powder composition was measured and calculated by the aforementioned measurement method. As a result, the methanol content was 3.71 wt %, and the acetoacetylation degree was 5.3 mol %. The saponification degree and the average polymerization degree were the same as those of the unmodified PVA.

<Measurement and Calculation of Insoluble Content>

After about 20 g (S g) of the dried AA-PVA powder composition was dispersed in 200 ml of ion-exchanged water in an Erlenmeyer flask, the AA-PVA powder composition was stirred in the ion-exchanged water at 95° C. for 1 hour to be thereby dissolved in the ion-exchanged water. The resulting solution was filtered through a 44-μm wire mesh (Ag) and preliminarily weighed. Insoluble substances in the Erlenmeyer flask were completely transferred onto the wire mesh and washed with 2 liters of 80° C. to 90° C. hot water, and then dried at 105° C. for 2 hours by an electric constant temperature drier. The weight (B g) of the insoluble substances was measured. The insoluble content (%) was calculated from the following expression (1) based on the measured values. The results are shown below in Table 1.

$$[(B-A)/S] \times 100 \qquad (1)$$

Example 2

AA-PVA powder composition was prepared in substantially the same manner as in Example 1, except that the drying period was 90 minutes. The measurement and the evaluation were performed on the thus prepared AA-PVA powder composition in the same manner as in Example 1. The results are shown below in Table 1.

Example 3

AA-PVA powder composition was prepared in substantially the same manner as in Example 1, except that the drying period was 180 minutes. The measurement and the evaluation were performed on the thus prepared AA-PVA powder composition in the same manner as in Example 1. The results are shown below in Table 1.

Comparative Example 1

AA-PVA powder composition was prepared in substantially the same manner as in Example 1, except that the drying period was 960 minutes. The measurement and the evaluation were performed on the thus prepared AA-PVA powder composition in the same manner as in Example 1. The results are shown below in Table 1.

TABLE 1

|  | Drying period (min) | Methanol content (wt %) | Insoluble content (wt %) |
| --- | --- | --- | --- |
| Example 1 | 60 | 3.71 | 0.003 |
| Example 2 | 90 | 2.11 | 0.001 |
| Example 3 | 180 | 0.82 | 0.001 |
| Comparative Example 1 | 960 | 0.22 | 0.006 |

The above results indicate that the AA-PVA powders of Examples each having a methanol content falling within the predetermined range each formed an AA-PVA aqueous solution having a very low insoluble content. In contrast, the AA-PVA powder of Comparative Example 1 having a methanol content falling outside the predetermined range formed an AA-PVA aqueous solution having a higher insoluble content. This means that the AA-PVA powders of Examples were highly soluble in water.

While specific forms of the embodiment of the present invention have been shown in the aforementioned inventive examples, the inventive examples are merely illustrative of the invention but not limitative of the invention. It is contemplated that various modifications apparent to those skilled in the art could be made within the scope of the invention.

The inventive AA-PVA powder composition is advantageously used, for example, in application fields of molding/forming materials, adhesive agent materials, coating agent materials, hydrophobic resin blending agents, suspension dispersion stabilizing agents, emulsion dispersion stabilizing agents, tackifiers, flocculating agents, exchange resins, and the like.

The invention claimed is:

1. An acetoacetyl group-containing polyvinyl alcohol resin (AA-PVA) powder composition comprising:
    acetoacetyl group-containing polyvinyl alcohol resin particles consisting of a structural unit represented by the following formula (1), a vinyl alcohol structural unit and a vinyl acetate structural unit:

and
    a C1 to C3 alcohol in an amount of 0.5 to 4 wt. % of the powder composition.

2. The acetoacetyl group-containing polyvinyl alcohol resin powder composition according to claim 1, wherein the C1 to C3 alcohol is methanol.

3. A method of producing the acetoacetyl group-containing polyvinyl alcohol resin powder composition according to claim 1, the method comprising:
    preparing acetoacetyl group-containing polyvinyl alcohol resin particles through a reaction of a powdery polyvinyl alcohol resin with diketene;
    washing the acetoacetyl group-containing polyvinyl alcohol resin particles with a C1 to C3 alcohol to remove an unreacted portion of the diketene and thereby to form an intermediate acetoacetyl group-containing polyvinyl alcohol resin particles composition; and
    drying the intermediate acetoacetyl group-containing polyvinyl alcohol resin particles composition at a temperature of 40° C. to 120° C. at a pressure of not higher than 20 kPa so as to control an alcohol content of the intermediate acetoacetyl group-containing polyvinyl alcohol resin particles composition obtained by washing the AA-PVA particles at 0.5 to 4 wt. % after the washing to form the acetoacetyl group-containing polyvinyl alcohol resin powder composition.

4. A method of producing the acetoacetyl group-containing polyvinyl alcohol resin powder composition according to claim 2, the method comprising:
    preparing acetoacetyl group-containing polyvinyl alcohol resin particles through a reaction of a powdery polyvinyl alcohol resin with diketene;
    washing the acetoacetyl group-containing polyvinyl alcohol resin particles with a C1 to C3 alcohol to remove an unreacted portion of the diketene and thereby to form an intermediate acetoacetyl group-containing polyvinyl alcohol resin particles composition; and
    drying the intermediate acetoacetyl group-containing polyvinyl alcohol resin particles composition at a temperature of 40° C. to 120° C. at a pressure of not higher than 20 kPa so as to control an alcohol content of the intermediate acetoacetyl group-containing polyvinyl alcohol resin particles composition obtained by washing the AA-PVA particles at 0.5 to 4 wt. % after the washing to form the acetoacetyl group-containing polyvinyl alcohol resin powder composition.

5. The method of producing the acetoacetyl group-containing polyvinyl alcohol resin powder composition according to claim 3, wherein a drying period is in a range of 30 to 120 minutes.

6. The method of producing the acetoacetyl group-containing polyvinyl alcohol resin powder composition according to claim 4, wherein a drying period is in a range of 30 to 120 minutes.

* * * * *